United States Patent

[11] 3,617,645

[72] Inventor Robert H. Gumley
Colts Neck, N.J.

[21] Appl. No. 842,652
[22] Filed July 17, 1969
[45] Patented Nov. 2, 1971
[73] Assignee Bell Telephone Laboratories, Incorporated
Murray Hill, N.J.

[54] SIGNALING CIRCUIT WITH AUDIBLE NOISE REDUCTION
7 Claims, 1 Drawing Fig.

[52] U.S. Cl. .......... 179/43

[51] Int. Cl. .......... H04m 5/16

[50] Field of Search .......... 179/16 C, 16 A, 16 AA, 84, 84 A, 84 SS, 84 VF, 172, 41 A, 43, 78; 307/146; 178/58

[56] References Cited

UNITED STATES PATENTS 2,636,945 4/1953 Hertog et al. .......... 179/16 A

*Primary Examiner*—Kathleen H. Claffy
*Assistant Examiner*—Randall P. Myers
*Attorneys*—R. J. Guenther and James Warren Falk

ABSTRACT: A signaling circuit connected between a signal source and a transmission path includes a pair of mutually coupled inductors connected in series with the conductors leading to the transmission path. The mutual coupling between the inductors operates to produce equal signals in the same direction on both conductors connected to the path.

PATENTED NOV 2 1971 3,617,645
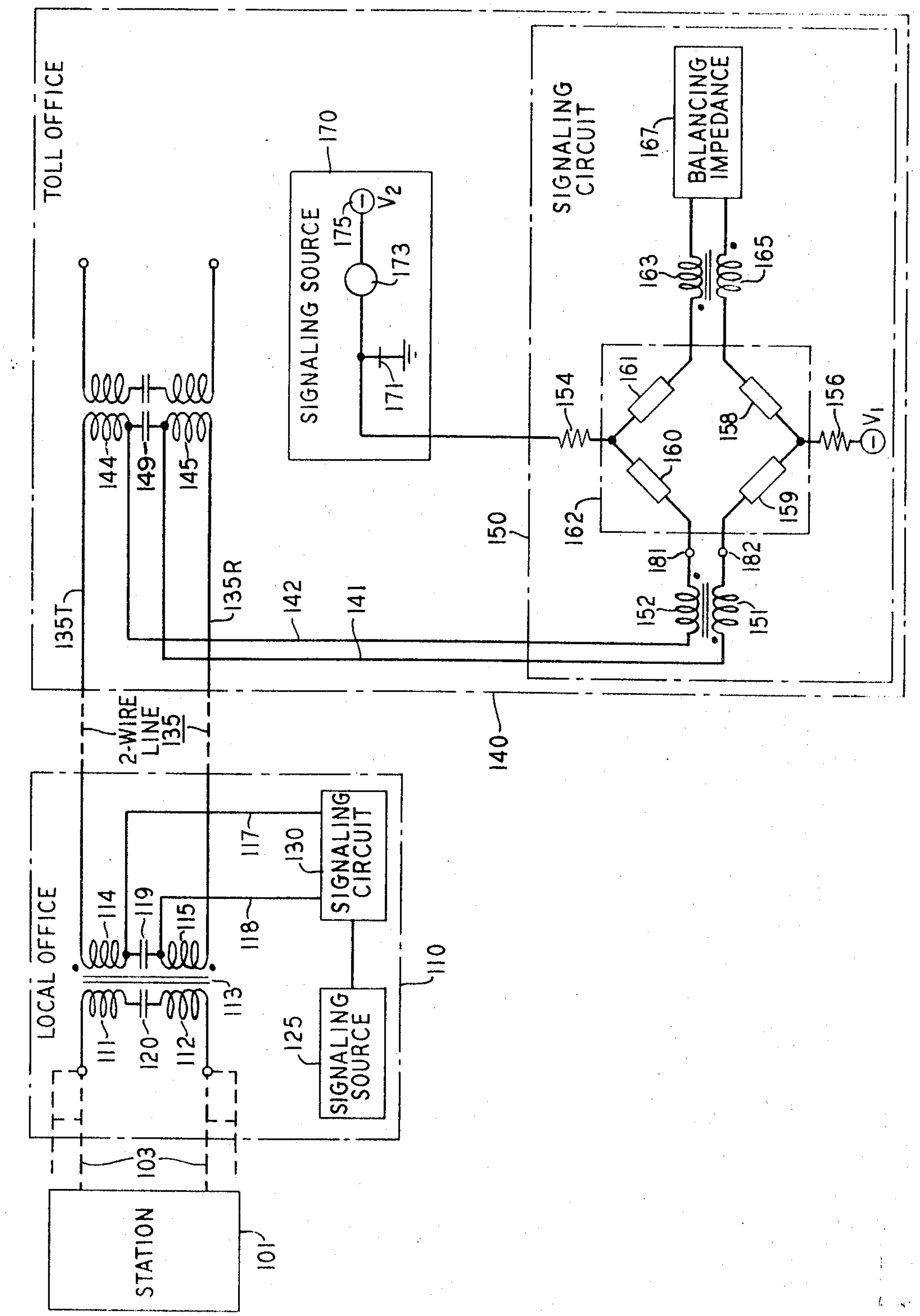
INVENTOR
R. H. GUMLEY
BY
J. S. Cubert
ATTORNEY

SIGNALING CIRCUIT WITH AUDIBLE NOISE REDUCTION

My invention is related to signaling arrangements and more particularly to telephone signaling circuits employing noise reduction apparatus.

In telephone systems where operator service is required, signaling initiated by the operator may be heard by an online party. The audible noise caused by such signaling serves no useful purpose but can be disturbing to the online party. This is particularly true with regard to coin stations. A call from a coin station generally requires the services of an operator to control the connection and to collect charges. In many coin telephone arrangements, high-energy wink signals are transmitted from the operator position to the station over a two-wire facility. The audible noise at the coin station generated by the wink signals occurs when the operator connects to the line, when the operator disconnects from the line, and when the operator interrupts the call for charging purposes. Wink signals may be limited time duration off-hook to on-hook pulses as, for example, described at pages 9–67 and 9–68 of "-Communication System Engineering Handbook" edited by Donald H. Hamsher and published by McGraw-Hill Book Company, 1967.

As is well known in the art, Duplex or DX signaling apparatus used in conjunction with a two-wire line or trunk provides signaling on only one wire of the line. The other wire is used to balance ground potentials between distant points. Thus, the signals transmitted over a two-wire facility by DX signaling apparatus are unbalanced so that audible noise suppression is difficult to achieve. Duplex or DX signaling apparatus is described in "DX Signaling, A Modern Aid to Telephone Switching" by N. A. Newell in the Bell Laboratories Record, Vol. 38, pages 216–220, June 1960. Where only a narrow band of frequencies within the voice range is used for signaling, rejection filters can effectively prevent audible noise from being heard by a calling party. In other systems known to the prior art, signals can be blocked from the desired path terminal by means of selectively operated switches. The switching arrangements for signal blocking must take into account the delay in transmission and other factors so that relatively complex and precise equipment is needed.

BRIEF SUMMARY OF THE INVENTION

It is an object of my invention to provide an improved signaling arrangement in a two-wire facility, which arrangement blocks signals and in particular audible signals from the signal receiving station of a two-wire telephone connection path.

My invention is a signaling circuit connected between a signal source and a transmission path. The circuit includes signaling apparatus and a pair of mutually coupled inductors each placed in series with the signaling apparatus and one conductor of the transmission path. The coupling arrangement between the inductors generates equal signals in the same direction on both conductors connected to the path whereby the signal is simplexed to eliminate loop signal components for purposes of audible noise reduction.

DESCRIPTION OF THE DRAWING

The FIGURE depicts a DX signaling system connected to a two-wire path between a pair of telephone offices.

DETAILED DESCRIPTION

The FIGURE shows a DX signaling arrangement between a toll office 140 and a local office 110 which local office is connected to station 101, e.g., a coin station, via coin telephone line 103. Toll office 140 may have operator positions associated therewith which utilize signal source 170 and signaling circuit 150. Signaling circuit 130 is coupled between signaling source 125 associated with station 101 and the trunk circuit connected to two-wire line 135. An identical signaling circuit 150 is shown connected between signal source 170 and the other terminal of two-wire trunk 135 in toll office 140. Signal source 170 and signaling circuit 150 are shown in detail, but it is to be understood that circuit 130 and circuit 150 are substantially identical to each other and that sources 125 and 170 are also substantially identical to each other.

Signal source 170 includes switch 173 and normally closed contact 171. Contact 171 connects the output lead of source 170 to ground while switch 173 selectively connects the output terminal to a negative voltage V2. The closing of switch 173 simultaneously opens contact 171 so that the output line of source 170 may be either at ground potential or at a relatively negative potential. The output of source 170 is applied to relay 162 which is part of a DX signaling circuit operative to repeat signals received from office 110 and to transmit signals from source 170 to office 110 without causing signaling within toll office 140. Signaling circuit 130 is controlled by the current flowing in response to negative reference potential $V_1$ and the output of source 170 via signaling circuit 150.

The balanced arrangement of relay coils 158, 159, 160 and 161, as is well known in the art, allows duplex signaling between circuits 150 and 130. In this signaling arrangement, signals from source 170 are transmitted via circuit 150, conductor 142, winding 144, wire 135T, winding 114 and conductor 117 to circuit 130. The other output of circuit 150 connected to conductor 141, winding 145, wire 135R, winding 115, and lead 118 provides a path to compensate for differing ground potentials between office 110 and office 140. As shown in the FIGURE, capacitors 119 and 149 by virtue of their added impedances operate to isolate the type of signals on wire 135T originating in signal source 170 from wire 135R, whereby wire 135T carries signals derived from signal source 170 while wire 135R operates to compensate for differing DC ground potentials between circuits 130 and 150. Thus, in the absence of inductors 151 and 152, signals are only applied to winding 114 via conductor 135T, and audible noise generated by such signals may be heard by an online party at station 101. This is so because the signal current in winding 114 is coupled through transformer 113. If an equal signal current is applied to winding 115 from conductor 135R, the two signal currents cancel each other so that the signal is simplexed. In this event, no signal is coupled to station 101. Consequently the party at station 101 is not annoyed by audible noise due to signaling.

My invention is a simple circuit arrangement that provides simplexing in a DX signaling circuit wherein signals are applied over one wire and the other wire provides ground balancing. The arrangement of inductors 151 and 152 inserted in series between the relay coils 159 and 160 and conductors 141 and 142 allows simplexing without the need for changes in outside plant or modification to the relay networks of circuits 150 and 130. In accordance with my invention, closing of switch 173 in source 170 causes a negative signal current to be applied to conductor 142 via resistor 154, relay coil 160, and inductor 152. Inductor 152 is magnetically coupled to inductor 151. The current flowing through inductor 152 produces a voltage across inductor 151 which, in turn, causes a signal current to be applied to conductor 141. The mutual coupling arrangement between inductors 151 and 152 causes equal signal currents to flow in the same direction in both conductors 141 and 142. The magnitude of the inductance may be selected to make only audible frequency components of the currents on conductors 141 and 142 equal. Disturbances such as noise affecting current flow in conductor 141 are, of course, coupled to conductor 142 to reduce the effect of the disturbance at station 101.

The signal currents from conductors 141 and 142 are applied to two-wire line 135 so that equal currents or at least equal audible frequency components of the currents flow in the same direction through wires 135T and 135R to windings 114 and 115. Where windings 114 and 115 have the same number of turns, the direction of these windings may be arranged so that the magnetic flux produced in winding 114 cancels the flux produced in winding 115 and no signal is applied to windings 111 and 112, and, more particularly, no audible frequency energy is applied to windings 111 and 112. In this way, the signals applied to two-wire line 135 are canceled in transformer 113 and no unwanted noise due to signaling is transmitted to station 101. The current through winding 114 is, of course, applied via lead 117 to operate signaling circuit 130 whereby the signal from circuit 150 is transmitted to signaling circuit 130 associated with station 101. In this way the current on two-wire line 135 from signaling circuit 150 is simplexed to prevent disturbing audible noise at station 101.

As is well known in the art, a sending DX signaling circuit does not operate in response to a signal applied from its own signal source. This is so because of the balanced arrangement of relay coils as illustrated by relay coil signal detecting circuit 162. The application of a signal from source 170 does not affect the net magnetic field produced by coils 159, 160, 158 and 161 so that the signal is not detected in circuit 150. In order to maintain the balance of the relay coils, balancing impedance 167 is connected between relay coils 158 and 161. The balancing impedance is equal to the impedance seen at points 181 and 182 looking toward the local office connection. Since, in accordance with my invention, mutually coupled inductors 151 and 152 are connected to points 181 and 182, an identical inductance arrangement must be connected between relay coils 158 and 161 and balancing impedance 167. The inclusion of inductors 163 and 165 completes the balanced arrangement for proper operation of the DX signaling circuit.

What is claimed is:

1. A DX signaling circuit connected between a signal source and a two-wire transmission path comprising a pair of conductors each connected to a different one wire of said path, a signal-detecting circuit including a first relay coil having first and second terminals, said first terminal being coupled to said signal source, a second relay coil having third and fourth terminals, said third terminal being coupled to a source of potential, and means connected between said second terminal and one of said pair of conductors and between said fourth terminal and the other of said pair of conductors responsive to a signal from the second terminal of said first relay coil for applying an equal signal in the same direction to each of said conductors.

2. A DX signaling circuit connected between a signal source and a two-wire transmission path according to claim 1 wherein said equal signal-applying means comprises a first inductor connected in series between said one conductor and said first relay coil second terminal and a second inductor connected in series between said other conductor and said second relay coil fourth terminal, said inductors being mutually coupled to produce an equal signal in the same direction on each of said conductors.

3. A DX signaling circuit connected between a signal source and a two-wire line according to claim 2 wherein said detecting circuit further comprises third and fourth relay coils each having two terminals, one terminal of said third relay coil being coupled to said signal source, one terminal of said fourth relay coil being coupled to said potential source, an impedance balancing circuit having two terminals and a further pair of mutually coupled inductors, one of said further pair of mutually coupled inductors being connected between the other terminal of said third relay coil and one terminal of said impedance balancing circuit, the other of said pair of mutually coupled inductors being connected between the other terminal of said fourth relay coil, and the other terminal of said impedance-balancing network, said further pair of mutually coupled inductors being operative to balance the impedances of said first and second inductors.

4. A DX signaling circuit connected between a signal source and a two-wire trunk associated with a coin telephone line comprising a pair of conductors each connected to a different one wire of said trunk, first relay coil means having first and second terminals, second relay coil means having third and fourth terminals, said first terminal being coupled to said signal source, said third terminal being coupled to a source of potential, said first relay coil means being effective to couple a pulse signal from said signal source to said second terminal, a first inductor connected between said second terminal and one of said conductors, a second inductor connected between said fourth terminal and the other of said conductors, said first and second inductors being mutually coupled and responsive to said pulse signal from said second terminal to produce an equal pulse signal in the same direction on each of said conductors whereby the pulse signal applied to said line is simplexed.

5. A DX signaling circuit according to claim 4 wherein said first and second inductors are mutually coupled inductors operative to couple the audible-frequency portion of said pulse from said second terminal to the other conductor.

6. In a telephone system having a two-wire line connected between a local office and a toll office, a signaling circuit comprising a signal source, first and second conductors, said first conductor being connected to one wire of said line and said second conductor being connected to the other wire of said line, first relay coil means having a first terminal coupled to said signal source and a second terminal, said first relay coil means being effective to couple a signal from said signal source to said second terminal, second relay coil means having a third terminal coupled to a source of potential and a fourth terminal, means connected between said second terminal and said first conductor and between said fourth terminal and said second conductor for coupling the audible frequency portion of said signal from said second terminal to said first conductor and to said second conductor, said signal-coupling means being operative to produce an equal audible-frequency signal in the same direction on each of said first and second conductors.

7. In a telephone system having a two-wire connected between a local office and a toll office, a signaling circuit according to claim 6 wherein said signal-coupling means comprises a pair of inductors, one inductor being connected between said second terminal and said first conductor and the other inductor being connected between said fourth terminal and said second conductor, said inductors being magnetically coupled to produce an audible-frequency signal on said second conductor equal in magnitude and in the same direction as the audible-frequency portion of the signal applied to said first conductor from said second terminal.

* * * * *